United States Patent
Pellenc

(10) Patent No.: US 7,096,654 B2
(45) Date of Patent: Aug. 29, 2006

(54) LEAF STRIPPER, MORE PARTICULARLY DESIGNED FOR SELECTIVE VINE LEAF STRIPPING

(75) Inventor: Roger Pellenc, Pertuis (FR)

(73) Assignee: Pellenc, Societe Anonyme, Pertuis (FR)

( * ) Notice: Subject to any disclaimer, the term of this patent is extended or adjusted under 35 U.S.C. 154(b) by 115 days.

(21) Appl. No.: 10/500,650

(22) PCT Filed: Jul. 10, 2003

(86) PCT No.: PCT/FR03/02176

§ 371 (c)(1),
(2), (4) Date: Jul. 1, 2004

(87) PCT Pub. No.: WO2004/006653

PCT Pub. Date: Jan. 22, 2004

(65) Prior Publication Data

US 2005/0081501 A1  Apr. 21, 2005

(30) Foreign Application Priority Data

Jul. 12, 2002 (FR) .................................. 02 08817

(51) Int. Cl.
*A01D 46/00* (2006.01)
(52) U.S. Cl. ...................................................... 56/330
(58) Field of Classification Search .................. 56/330, 56/328.1, 331, 10.1, 27.5
See application file for complete search history.

(56) References Cited

U.S. PATENT DOCUMENTS 4,896,486 A * 1/1990 Lundahl et al. .......... 56/10.2 E

FOREIGN PATENT DOCUMENTS

| EP | 0278607 A1 | * | 8/1988 |
| EP | 0 597 253 A | | 5/1994 |
| FR | 2 417 932 A | | 9/1979 |
| FR | 2483168 | * | 4/1982 |
| WO | WO01/87047 | * | 11/2001 |
| WO | WO 01 87047 A | | 11/2001 |

* cited by examiner

*Primary Examiner*—Árpád Fábián Kovács
(74) *Attorney, Agent, or Firm*—Egbert Law Offices

(57) ABSTRACT

A leaf stripper which is intended more specifically for stripping vine leaves includes a stripping head which is equipped with a rotary drum with an open-work cylindrical side wall, rotator device for the drum, suction device which can be used to generate a suction air stream that passes through the aforementioned open-work cylindrical side wall of the drum, and a mechanism of channeling the air stream through a portion modifying the side wall. There is a cutting device which is installed close to the side wall portion of the rotating suction drum and which is positioned parallel or essentially parallel to the axis of rotation of the drum. The open-work cylindrical wall of the drum is made from a flexible, deformable material which is permeable to the air stream.

29 Claims, 14 Drawing Sheets

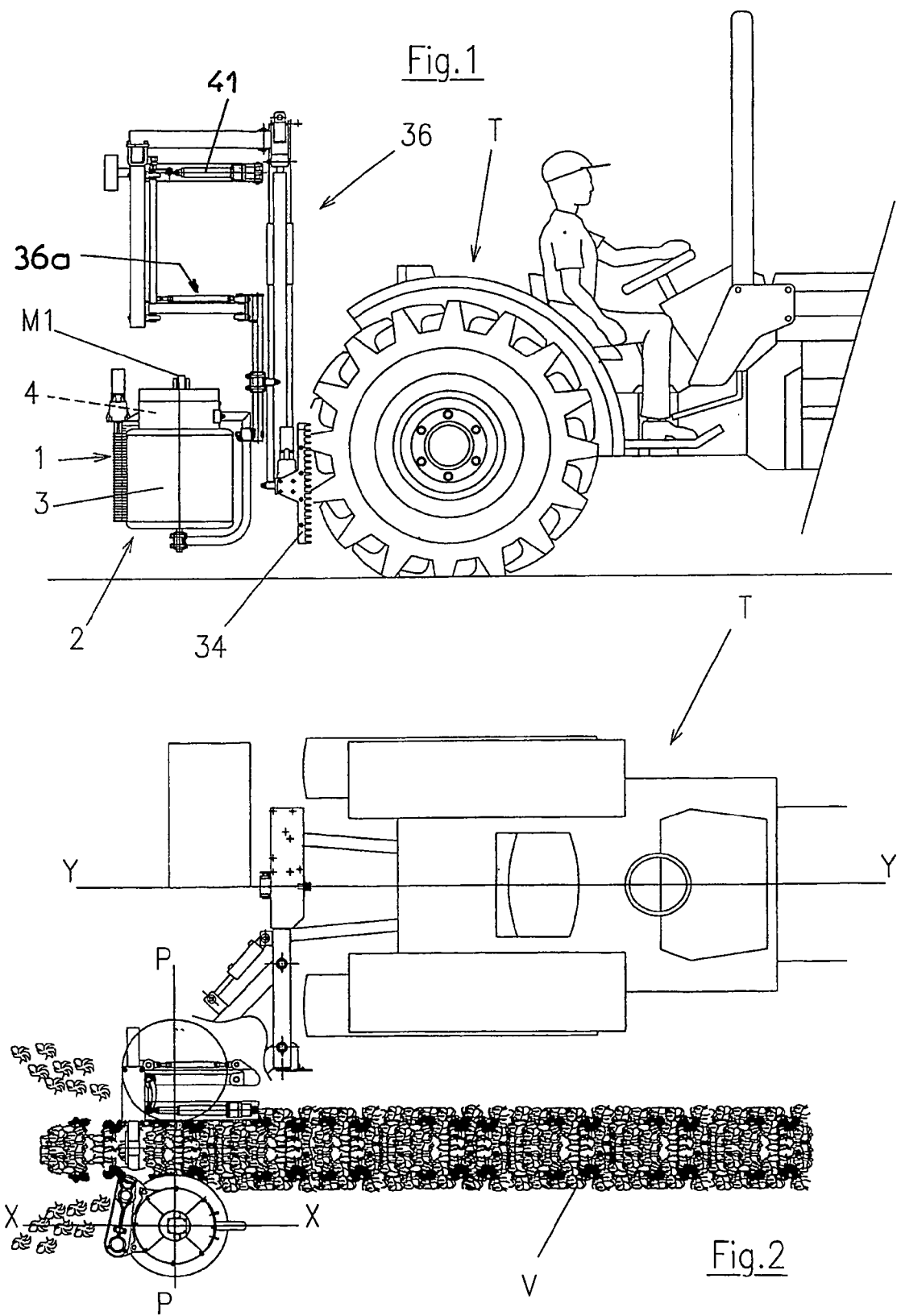

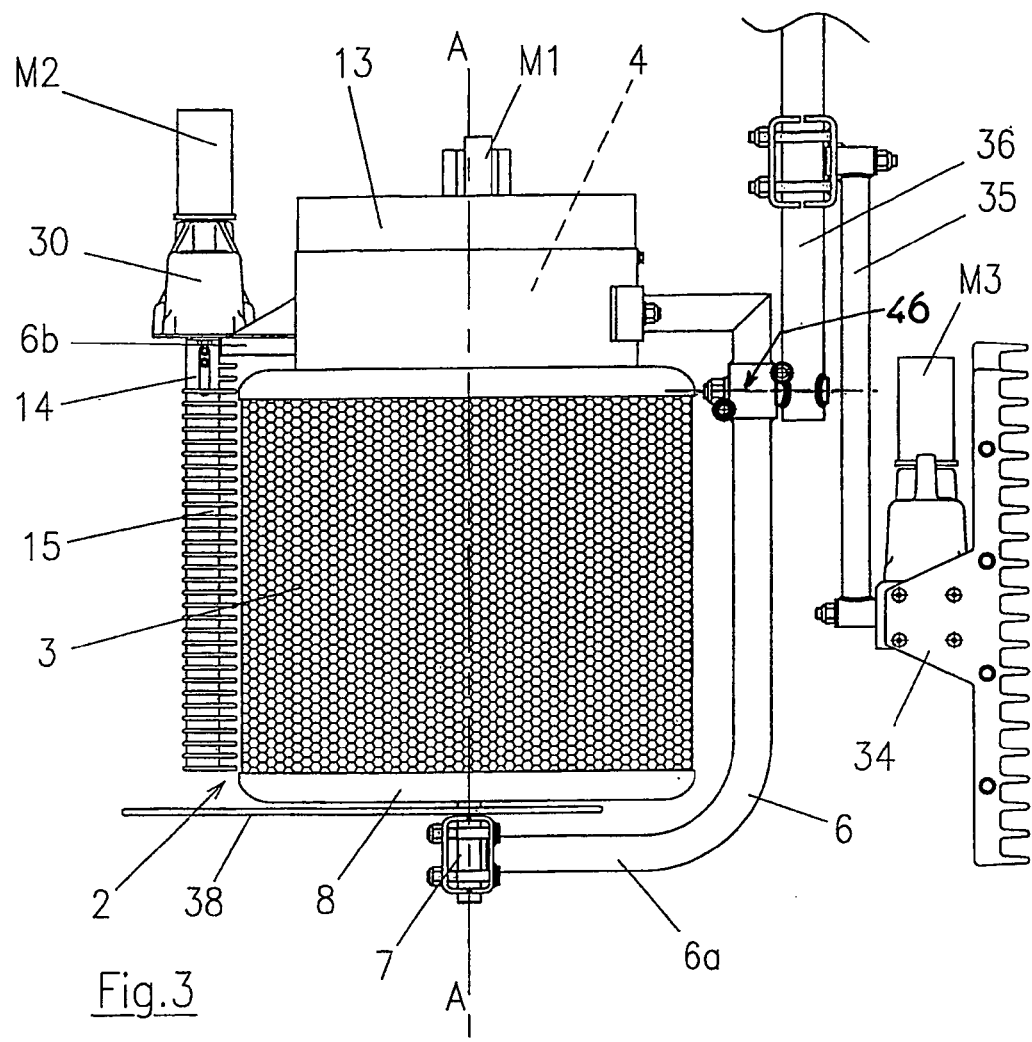
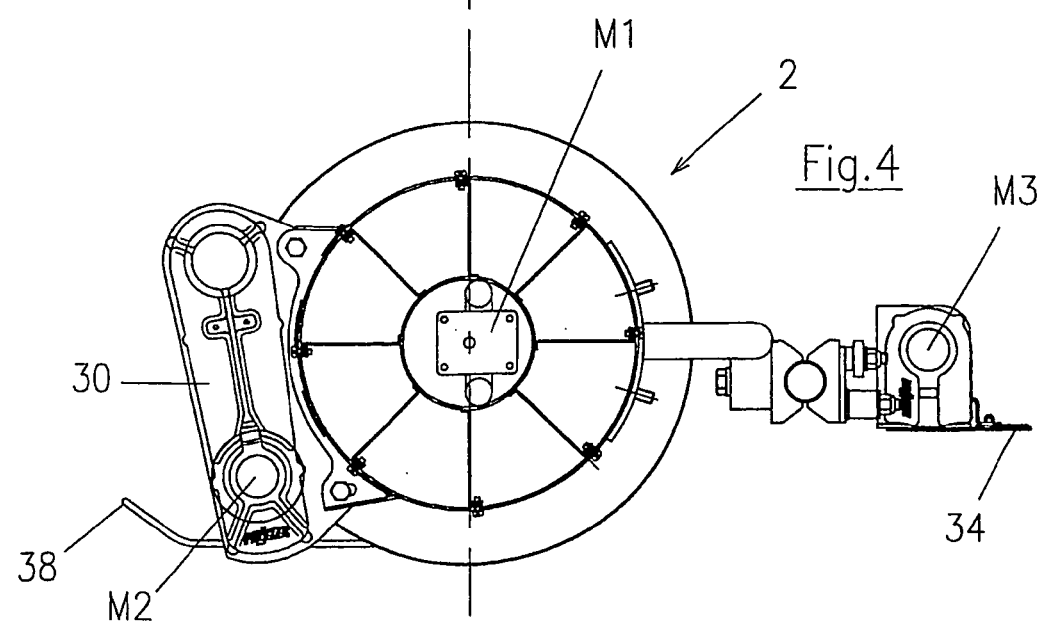

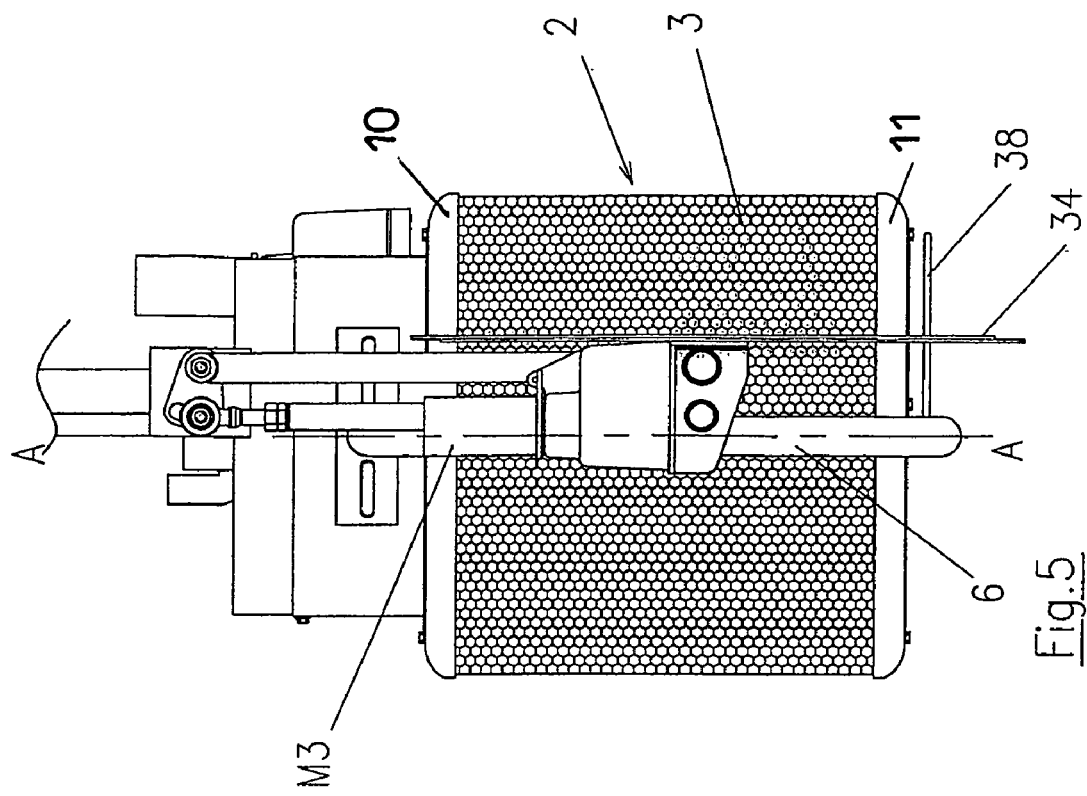
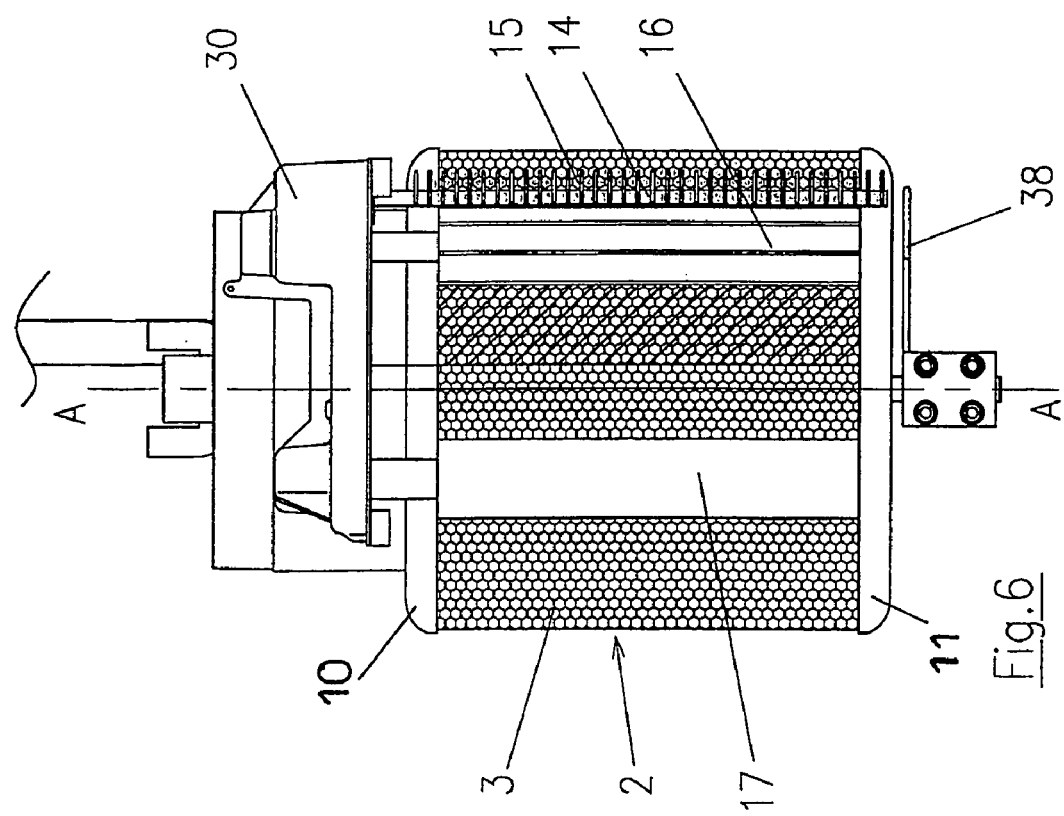

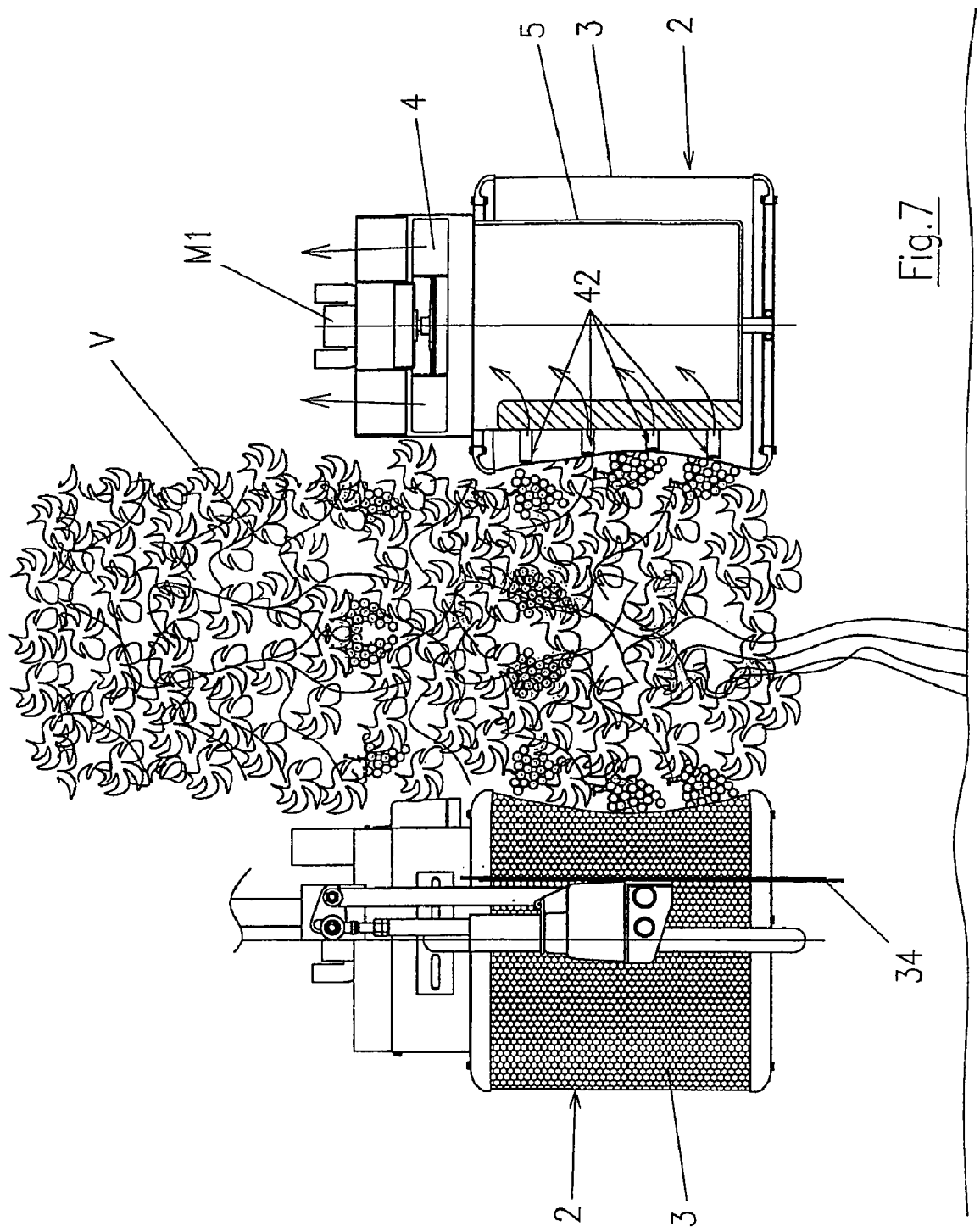

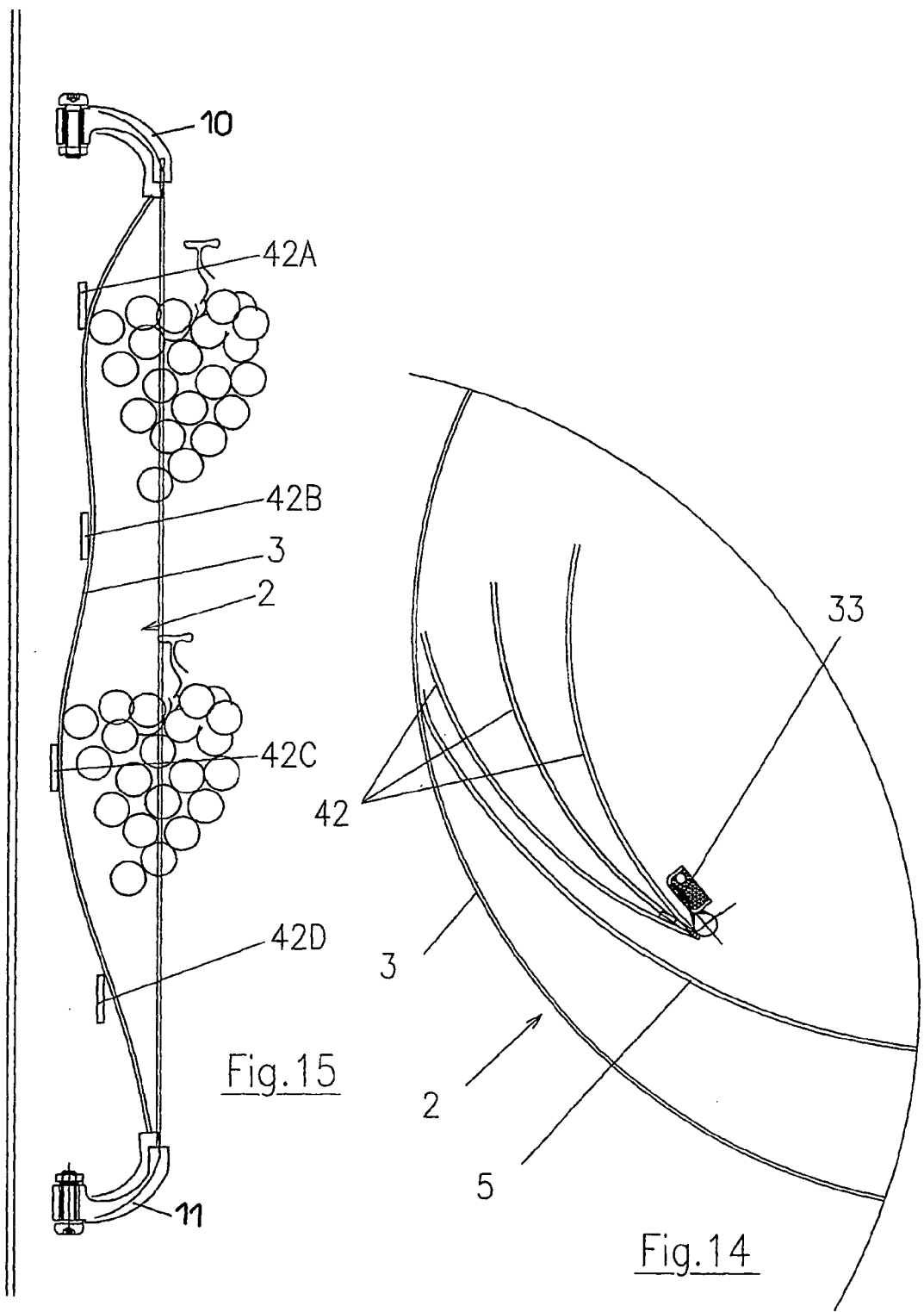

LEAF STRIPPER, MORE PARTICULARLY DESIGNED FOR SELECTIVE VINE LEAF STRIPPING

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention involves a leaf stripping machine specifically designed for selective leaf stripping of a vine.

BACKGROUND OF THE INVENTION

Leaf stripping is a technique that consists in eliminating a more or less sizeable quantity of leaves located in the fructiferous zone of plants. Done manually for a long time in some vineyards, this operation, which aims to improve the quality of the harvest and to make easier the manual work of thinning and picking, is experiencing a growing interest with the development of mechanical leaf stripping.

The interests in leaf stripping are manifold:

Promote the aeration of bunches of grapes in order to reduce rot;

Promote thinning in order to improve the coloration (thicker grape skin);

Thin out the vegetation layer in the fructiferous zone for better penetration and localization of treatments (botrytis; oidium; gray mold; grape worm; mildew)

Improve the maturation of the grapes by a better exposure to the sun (grapes heavier, flavors more developed and a better sanitary state of the grape harvest);

Promote access to the grapes in order to reduce the time of labor in manual operations such as thinning (−50%), manual harvesting (−30% to −40%);

Reduce the foliage in order to limit the losses of juice due to the intake of leaves from the rest of the harvest when it is done mechanically; and Make drying easier in case of rain by a better exposure to the sun and a better aeration.

Leaf stripping thus turns out to be an operation that is very much of interest and that corresponds well to the problem of optimization of tasks and the pursuit of quality of the harvest.

Several machines and processes have been proposed to date and some of them are currently still being used to accomplish this work.

According to a technique for leaf stripping developed by the applicant, in order to accomplish the task, a machine is used that consists of an open rotary drum, an intake mechanism that makes it possible to generate an intake flow of air that passes from the drum through the lateral cylindrical wall having lateral openings, a mechanism to direct the flow of air through a varying portion of the lateral wall, in a manner so as to catch and pin the leaves against the open lateral wall of the rotary drum, and a system for leaf stripping that makes it possible to pick off the leaves pinned against this wall.

For example, in the document FR-2,417,932-A, a device for leaf stripping is described that uses an open rotary cylindrical cage to roll on the vegetation layer and inside of it, a hollow cylinder is housed affixed and equipped with an opening. An aspirator mounted above the inside hollow cylinder makes it possible to create, inside of the inside cylinder, a partial vacuum that has the effect of sucking in the leaves of the vegetation and pinning them against the open rotary cage facing the opening of the fixed cylinder. Contact rollers mounted on articulated supports are applied under pressure against the lateral surface of the cage and are driven in rotation by this surface. The leaves come to get caught between the turning open drum and the contact rollers, and are torn off of the branches under the force of traction resulting from the movement of the machine.

A priori, the principle of parting of the foliage by means of an intake flow of a turbine through an open rotary drum that makes it possible to pull and pin the leaves on the lateral surface of the drum appears clever and economical. It does not appear, however, that the machine described in the document FR-2,417,932 was put on the market, and to the knowledge of the applicant, no stripping machine using this principle is being marketed today.

The failure of this machine results certainly from the fact that the principle of separating the leaves using frictional contact rollers does not appear to be able to be applied concretely for several reasons.

Following the description and the drawings of document FR-2,417,932, the articulated supports mounted on springs carrying the contact rollers are assigned to be arranged, during work, in the vegetation layer; this arrangement can not be applied due to the fact that these supports rub in the vegetation layer and hinder the aspiration of the leaves because they push back the vegetation; it is not possible to arrange the mechanical instruments in the vegetation layer beyond the wall of the rotary cage, since they would collide with and be torn off by various obstacles located in the axis of the vine row, such as stakes, guy wires, and above all, poles.

Due to the fact that a relatively sizeable force is necessary in order to remove the leaves by tearing them off, it is hardly probable that the force generated by friction of the contact rollers on the drum will be sufficient, especially if the leaves or the vine shoots become positioned between the wall of the cage and the contact rollers.

This device, as a result of its position relative to the vegetation layer, and as a result of its principle of separating the leaves by tearing them off, can only cause jamming of the system by accumulation of the plants and damage to the vine.

According to the document FR-2,808,964 A, the applicant has proposed a leaf stripping machine more specifically designed for stripping the leaves of a vine, consisting of at least one leaf stripping head, consisting of an open rotary drum, an aspiration mechanism making it possible to create an intake air flow going through the lateral cylindrical opened wall of this drum, a mechanism to channel this air flow through a varying portion of the lateral wall, and a cutting mechanism installed near the portion of the lateral wall of the turning intake drum oriented in parallel or approximately parallel to its axis of rotation, the cutting mechanism is arranged behind a diametral plane of the rotating drum oriented perpendicularly to the direction of movement of the machine during work.

This machine represents a first stage of progress to the extent that it makes it possible to perform leaf stripping with a quality comparable to a trimming of the vegetation layer, taking into account the fact that the leaves are cut and not torn, contrary to the solutions previously proposed which remove the leaves by tearing them off using blades or knives, or jamming contact rollers.

After separating, the leaves remain pinned against the opened lateral wall of the turning drum and are driven outside the intake field by the rotation of this wall. When the portion of the lateral wall covered with cut leaves is isolated from the intake field by the channeling baffle of the intake flow, the leaves, no longer subjected to the attraction of the air flow, fall due to gravity. This result comprises another advantage, because it eliminates projections of torn leaves likely to cause risks of disease as a result of the particles and dust propelled by blast of the turbine onto the adjacent vine rows.

However, it has been noted that the quantity of the leaves removed remained insufficient to obtain all of the sought-after results, the partial vacuum generated by the aspirator mechanism does not always exert a strong enough traction action to move the leaves that are only pinned against the turning drum, in the direction of the cutting mechanism.

The document WO 01/87047 A describes an evolution of the leaf stripping machine shown in the document FR-2, 808,964 A.

According to this document, the leaf stripping head or each leaf stripping head of the leaf stripping machine consists of a tracked guide mechanism comprised of an endless opened belt wound, on the one hand, on the turning aspirating drum and, on the other hand, on a second drum arranged in front of the aspirating drum, the endless opened belt having, on the side of the leaf stripping machine assigned to face the vegetation layer, comprised of the vine row, during work, a trajectory or rectilinear portion, parallel to the path of movement of the leaf stripping machine, in a manner so as to have a planar support surface.

The opened tracked mechanism created in this way has the function of ensuring a good guidance and stability of the leaf stripping head on the vegetation layer. It ensures a flexible support of the leaf stripping head on the vegetation layer, while avoiding crushing the vegetation layer as a result of its large contact surface.

On the other hand, the cutting mechanism of the machine described in the document WO-01/87047 is comprised of a spiral cutting bar consisting of, on the one hand, a cutting screw comprised of a cylindrical rotary shaft equipped with a spiral threading having at least one sharp edge and, on the other hand, a bed knife comprised of a fixed cylindrical sleeve, open laterally, and inside of which the cutting screw is housed.

It has been observed that the machine constructed in this way tears the leaves to pieces and tears off a non-negligible quantity of young vine shoots.

In summary, though the two versions of the leaf stripping machines described, respectively, in the document FR-2, 808,964 A, and in the document WO 01/87047 A have made it possible to simplify the technical nature of utilization of the equipment, while improving the quality of the leaf stripping machine, it has been noted:

that the adjustment of the intensity of the leaf stripping is still difficult and depends on the dexterity of the driver of the machine;

that the percentage of leaves cut to pieces or lacerated is not always negligible; and that the quantity of injuries inflicted on the grape bunches, especially when the leaf stripping is done late in the season, still remains an unresolved problem for the wine-growers.

The invention notably has the objective of proposing solutions to the problems mentioned above.

BRIEF SUMMARY OF THE INVENTION

For this purpose, a leaf stripping machine of the type described in the document FR-2,808,964 A has been considered, consisting of a rotating drum that has an opened lateral cylindrical wall, mechanisms for driving this drum in rotation, an aspirating mechanism that makes it possible to generate an intake air flow through the opened lateral cylindrical wall of this drum, a mechanism to channel this air flow through a varying portion of the lateral wall, and a cutting mechanism installed near the portion of the lateral wall of the rotating intake drum and oriented parallel or approximately parallel to the axis of rotation of the drum, this cutting mechanism being arranged behind a diametral plane of the rotating drum oriented perpendicularly to the axis of movement of the leaf stripping head of the leaf stripping machine during work.

According to a first characteristic arrangement of the invention, the opened lateral cylindrical wall of the drum is made of a flexible material, whereby this opened flexible and deformable wall is preferably and advantageously comprised of meshes or interlaced metallic rings of the "coat of mail" type.

This flexible and deformable wall makes possible a better adaptation to the shape of the vegetation layer and to the obstacles present in it, avoids the crushing of the fruits and allows the installation, inside the drum, of sensor heads and/or stacked sensors that make it possible to measure the pressure exerted by the drum at different heights of the vegetation layer, in a manner so as to control the instruments ensuring the good positioning of the drum, relative to the vegetation layer. In this way, it is possible to regulate in a very precise manner the penetration of the drum into the vegetation and to ensure a continuous and perfect following of the vegetation layer.

Due to the fineness of the meshes of the lateral wall of the drum, the suctioned air is filtered and no remnants are sent into the vine by the aspirator above the machine.

According to another interesting characteristic arrangement of the invention, a supplementary mechanism for pulling the leaves is arranged parallel to the cutter bar and set back from it relative to the vegetation during work.

In an advantageous way, this supplementary pulling mechanism can be comprised of a rotating "feeder" coupled to a rotational drive device.

This supplementary pulling mechanism has the advantageous function of pulling in even more leaves and keeping them pinned against the lateral opened surface of the drum, so that they do not come out again.

Using this device, the leaves pinned against the drum are pulled in the direction of rotation of the drum and during this movement, the petioles of the leaves are cut by the cutting bar. Thus, tearing or crumbling of the leaves is avoided and as a result, so is the possibility for the propagation of certain diseases (cryptogamic or others) due to the dispersion of the remnants of the tenderized leaves that have been torn to pieces. This clean cut of the leaves produces a leaf stripping of a quality comparable to that of manual leaf stripping.

According to another important characteristic arrangement of the invention, the leaf stripping head or each leaf stripping head of the leaf stripping machine is suspended on a carrier chassis constructed and equipped with mechanisms making it possible to spread apart or bring together the leaf stripping head(s) of the movement axis of the leaf stripping machine, the working position of the leaf stripping head or of each of the leaf stripping heads relative to the axis being regulated by a system acting as a function of the deformations undergone by the flexible lateral wall of the drum and resulting from the support of it on the vegetation in the course of work.

In this manner, an excellent monitoring of the profile of the vegetation layer is obtained, while modulating the force of contact of the drum on the vegetation layer, in order to not crush the grape bunches due to pressure that is too large.

BRIEF DESCRIPTION OF THE SEVERAL VIEWS OF THE DRAWINGS

The goals, characteristics and advantages above, and still others, are best brought out in the description that follows and the attached drawings.

FIG. 1 is an elevation view of a first embodiment example of a leaf stripping machine according to the invention, shown hitched to the rear of a traditional farm tractor.

FIG. 2 is a top plan view of this leaf stripping machine consisting of two symmetrical leaf stripping heads, one of which is shown schematically, the leaf stripping machine being shown in the course of work on a vine row.

FIG. 3 is an elevation front view of one of the leaf stripping heads or modules of the leaf stripping machine shown without its carrier chassis.

FIG. 4 is a top plan view of FIG. 3.

FIG. 5 is a front view of this leaf stripping head.

FIG. 6 is a rear view of this leaf stripping head.

FIG. 7 is an elevation view of the leaf stripping machine consisting of two leaf stripping heads or modules arranged on both sides of a vine row, one of the modules being shown in an axial section.

FIG. 14 is a partial detailed plan view showing a sensor housed in the rotating drum in order to detect deformations of the flexible lateral wall of the drum when it is moved in rotation on the vegetation of the vine row.

FIG. 15 is a detailed vertical section view showing the deformation of the flexible wall of the rotating drum detected by the stacked sensors, during its passage over obstacles (here the grape bunches).

DETAILED DESCRIPTION OF THE INVENTION

Figure 8:
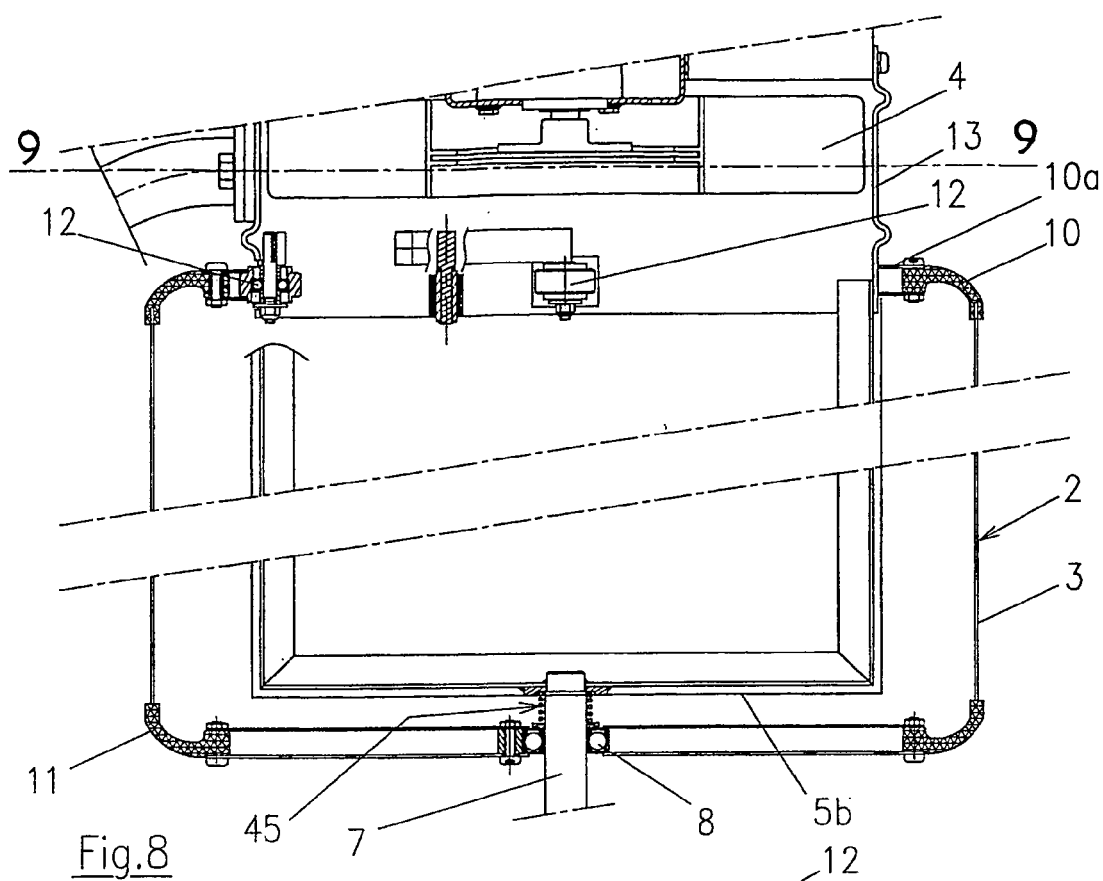
FIG. 8 is an axial section view of a leaf stripping drum.
Figure 9:
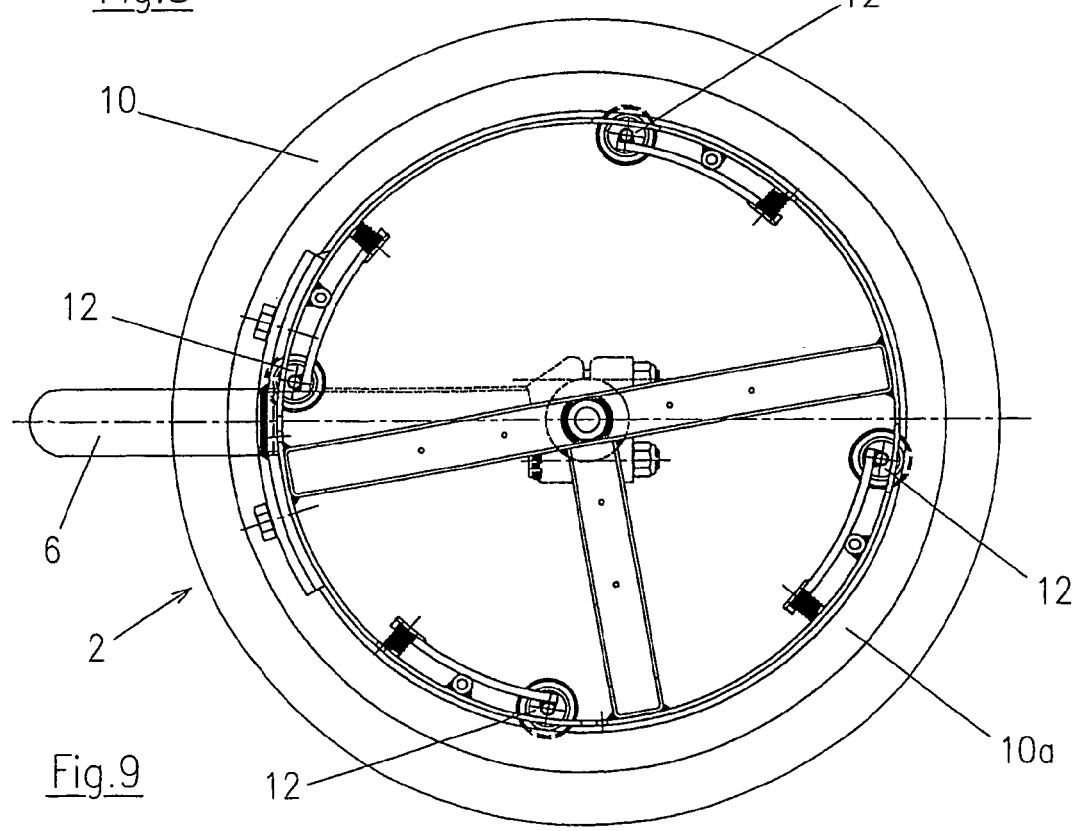
FIG. 9 is a section view along the line 9—9 of FIG. 8.

Reference is made to the drawings to describe an advantageous embodiment example, though in no way restrictive, of the leaf stripping machine according to the invention.

Though reference is made, in the following portion of the present document, solely to the use of this leaf stripping machine in order to make a leaf stripping machine specifically for the vine, it is obvious that such a usage is not restrictive and that this machine can be used in order to perform leaf stripping of other plants cultivated in the form of aligned shrubs.

This leaf stripping machine is of the type described in the document FR-2,808,964 A. It consists of at least one leaf stripping head or module 1 comprising a rotary aspirating drum 2 consisting of an opened cylindrical wall 3. In a preferred manner, the leaf stripping machine consists of two leaf stripping heads or modules 1 designed to be placed on both sides of the vegetation of the vine row, during work, in a manner so as to fit tightly around the fructiferous zones, all along its movement from one end of the row to the other.

The opened drum has, for example, a height of between 400 mm and 800 mm, according to the leaf stripping models, and a diameter on the order of 450 mm.

An aspirating turbine, for example, comprised of a helicoidal vacuum generator 4 activated by a hydraulic motor M1, is installed above the drum 2, in order to create a partial vacuum inside the drum, which generates an intake flow going through the opened lateral wall of the drum, causing the "gluing" of leaves of vegetation layer on the opened wall or grid of the drum.

Inside the drum 2, affixed and housed near the opened lateral wall 3 of the drum, is a mechanism for channeling the flow of air, this mechanism being advantageously comprised of a baffle 5, having a shape that is determined in order to optimize the efficiency of the aspirating system. This baffle 5 comprises a lateral wall 5a and a base 5b by the intermediary of which it is rigidly connected to a lower horizontal element 6a of the frame 6 of the leaf stripping head, for example, by means of an axle 7 supporting the lower bearing 8 that ensures the rotational guidance of the drum 2.

An opening 9 is arranged in the lateral wall 5a of the baffle. This opening extends, for example, over a height that is approximately equal to the height of the opened lateral wall 3 of the rotary drum and has a width on the order of 220 mm to 260 mm corresponding to an arc on the order of 70° to 80°.

Figure 16:
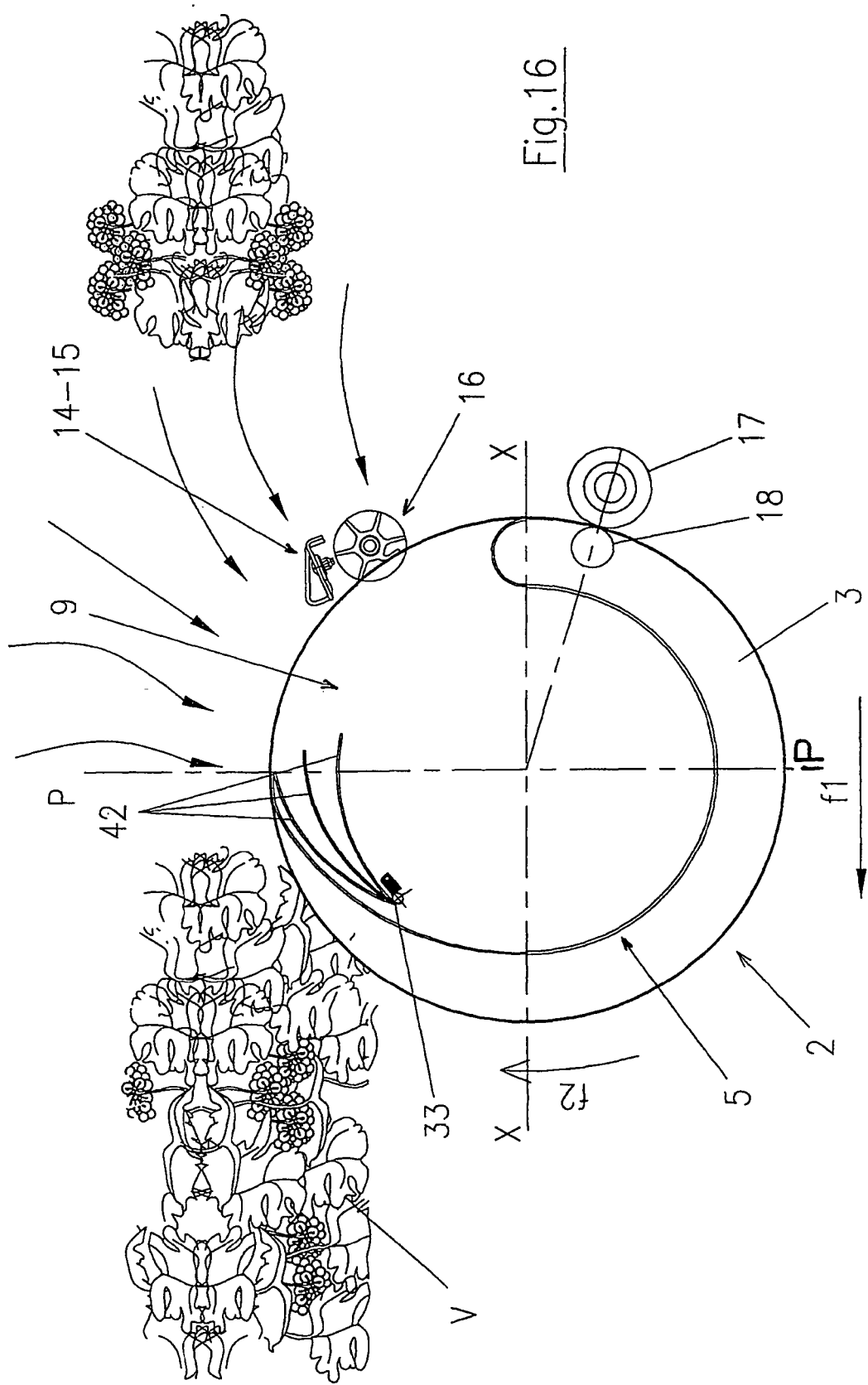
FIG. 16 is a schematic view having a schematic character and in a plane showing the cylindrical conformation of the lateral wall of the drum of the leaf stripping head when it rolls on the vegetation layer without encountering any obstacles.
Figure 17:
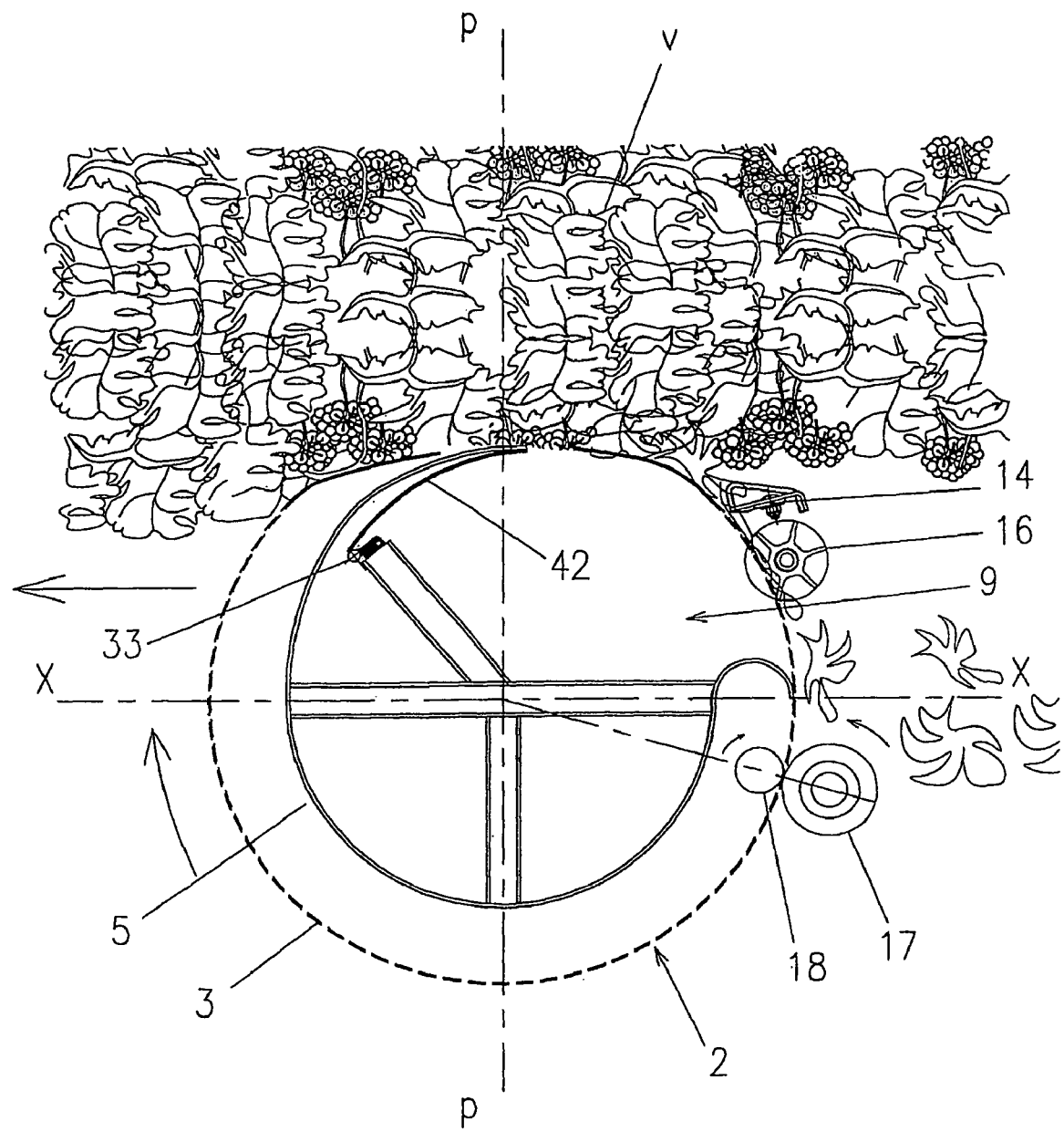
FIG. 17 is a schematic view similar to FIG. 16 and showing the withdrawal of the lateral support surface of the rotating drum when it encounters an obstacle (grape bunches, for example).

The major part of the area corresponding to the width of the opening 9 is arranged behind a diametral plane P-P of the opened rotary drum 2 perpendicular to the axis of movement X-X of the leaf stripping head 1 during work, as FIGS. 16 and 17 show.

The opening 9 of the baffle 5 is arranged near the opened cylindrical wall 3 of the rotary drum 2, in a manner so that the baffle ensures, on the one hand, the waterproofedness over a large part of the circumference of the opened drum, and, on the other hand, it channels, inside the drum, the air sucked in by the opening 9. It is understood that the air sucked in by the turbine 4 is channeled in the form of an intake flow that goes through a varying portion of the rotating cylindrical wall, the positioning and dimensions of this portion of the opened wall corresponding approximately to those of the opening.

The opening 9 and the portion of the opened wall passing by which is in front of it thus comprise an intake vent arranged in a zone of the drum designed to be in contact with the vegetation layer of the vine row.

According to this principle of aspiration of the leaves by direct contact with the vegetation layer, it appears that the partial vacuum flow necessary in order to catch and pin the leaves against the opened cylindrical wall of the drum can be relatively weak relative to the leaf stripping machines of other types that stay relatively far from the vegetation layer, which requires a very sizeable partial vacuum, thus much power in order to suck in the leaves into the cutting section.

The fixed baffle 5 has, laterally, an approximately cylindrical shape.

In the principle of the rotary contact cage, the intensity of the leaf stripping is proportional to the partial vacuum generated by the intake. The volume of the leaves cut can thus be regulated as a function of the vacuum force of the fan. This regulation of the vacuum force can, for example, be done either by making the speed of rotation of the turbine vary, or by slowing down the air output of the turbine.

The leaves are adhered by the vacuum on the cylindrical grid of the rotary drum. Under the combined effect of the pneumatic suction and the mechanical rotation of the drum, the leaves are pulled from the vegetation layer. The leaves, lighter than the grapes, also provide a larger surface for suction, in a manner such that a relatively weak partial vacuum, due to the density difference, is sufficient to "glue" the leaves against the opened lateral surface of the rotary drum, without necessarily attracting the grapes.

A cutting mechanism is installed near the mouth of the suction 9 of the rotary drum, in parallel or approximately parallel to the axis of rotation A-A of it.

The cutting mechanism can be advantageously comprised of an alternating cutting bar 14 consisting of a mobile blade 14a and a fixed bed knife 14b, or a linear movement cutting bar, or of any other device.

The cutting bar 14 is oriented in a manner so as to form an angle of ±/−45° and, preferably, an angle on the order of 20° with a radius of the rotating intake drum 2 passing by the active edge of the cutting bar. It extends, preferably, over a height corresponding to the height of the opened lateral portion of the drum that has the vacuum flow passing through it. A rigid, horizontal shaft in the form of a ski 38 is fixed on the lower part of the structure of the leaf stripping head; this shaft extends in front of the lower end of the cutting bar 14, in order to protect it, for example in case of an encounter with a very twisted vine stock.

According to a significant characteristic arrangement of the invention, the lateral wall 3 of the rotary drum 2 is comprised of a flexible material permeable to the air current. This flexible material permeable to the air current can be advantageously comprised of a metallic fabric formed from a multitude of meshes or interlaced metallic rings. A flexible metallic fabric of this type is generally designated by the name "coat of mail". The small rings that comprise this metallic fabric have, for example, a diameter on the order of 4 mm and a thickness on the order of 5/10 mm.

The upper and lower edges of this flexible opened lateral wall 3 are affixed to circular upper end elements 10 and circular lower end elements 11, respectively, these end elements being made in a semi-rigid deformable material such as, for example, rubber, polyurethane, or other semi-rigid plastic deformable material.

The opened drum thus made is suspended, with a rotational capacity, by the intermediary of its upper end element 10 and contact rollers 12, on the case 13 enclosing the intake turbine 4. The upper element 10 of the drum 2 is, for example, united in rotation with a circular track 10a that moves over the contact rollers 12 on vertical axles mounted on the cylindrical wall of the case 13, and subjected to the action of elastic pressure mechanisms against the track.

A spring 45 acting by compression and arranged around the vertical axis 7 is interposed between the bottom 5b of the baffle 5 and the lower guide bearing 8 of the drum 2, comprising an element of the base vertically mobile from it in order to extend the coat of mail 3 in the vertical direction.

The parts 5c, 5d of the baffle that define the aspirating mouth of the turning drum 2, rub against the internal surface of the lateral wall 3 of the drum. For this purpose, at least the parts 5c, 5d of the baffle 5 are made of a flexible material.

In an advantageous manner, the baffle 5 can be made of a flexible material, such as, for example, an impermeable cloth affixed to a rigid or semi-rigid frame.

According to another characteristic arrangement of the invention, a supplementary mechanism for pulling leaves is arranged behind the cutting mechanism 14 taking into consideration the direction of movement of the leaf stripping machine, during work, or, more specifically, the reverse direction to the direction of rotation of the turning drum 2 of the leaf stripping head of the machine.

In advantageous manner, this supplementary pulling mechanism can be comprised of a rotary feeder 16 tangent to the lateral wall 3 of the drum 2 and coupled to a rotational drive device, this rotary feeder being arranged in parallel to the cutting bar 14 and set back from it relative to the vegetation during work.

This rotary feeder 16 consists, for example, of an axle 16a, along which vertical flexible blades 16b are affixed, oriented radially or at an incline from front to back considering the direction of rotation of the axle.

It can also be comprised of a rotary brush.

The rotary feeder 16 is arranged next to the cutting bar and it is located in contact with the flexible side wall 3 of the drum 2, or very close to it (the maximum spacing being on the order of 8 mm). The rotary feeder 16 and the aspirating drum 2 are driven in rotation in the opposite direction and "downstream". The leaves pinned on the opened lateral wall of the rotating drum 2 under the action of the partial vacuum created by the turbine 4 are then found to be pinched between the wall and the feeder and pulled towards the rear of the drum. The pinching combines with the intake vacuum to keep the leaves pinned against the lateral wall of the drum, in order to improve the pulling of the leaves, which are detached when their petioles are cut by the cutting bar.

According to an embodiment mode of the invention, a comb 15 can be arranged in parallel and in front of the cutting bar, considering the direction of the movement of the leaf stripping machine (arrow f1), or, more specifically, the direction opposite the direction of rotation (arrow f2) of the rotating drum, during work (FIG. 16). This comb 15 comprises a plurality of stacked horizontal teeth or barrettes, slightly spaced, the spacing between the teeth being, for example, on the order of 5 to 15 mm.

Preferably, this comb 15 is replaceable and it is, for example, affixed in a manner so that it can be removed on the fixed bed knife 14b of the cutting bar.

In this way, it is possible to rapidly mount a comb whose spaces between teeth are adapted to the condition of the vegetation, which can be very variable as a function of the time of the leaf stripping or the variety of the grape.

Figure 10:
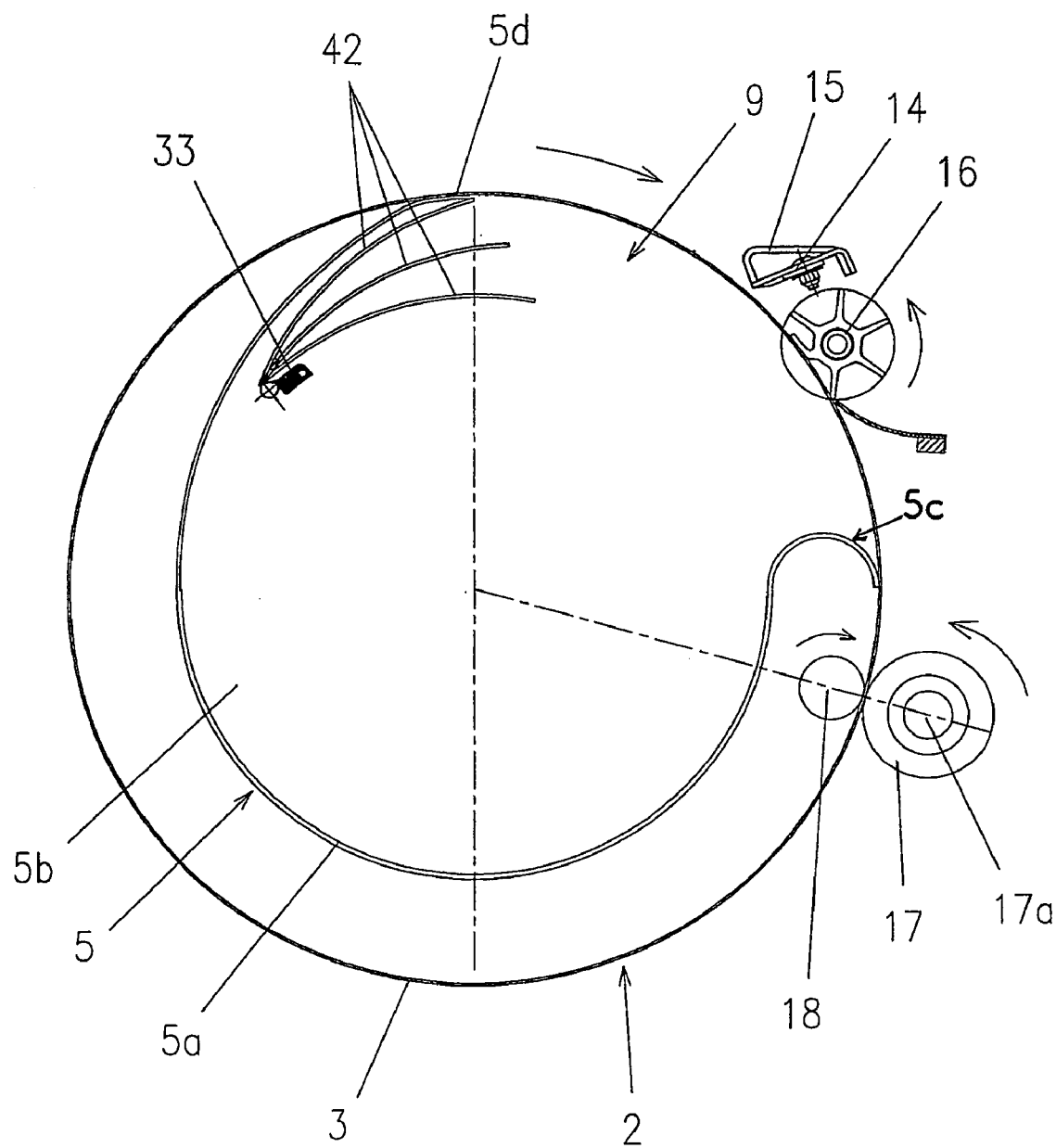
FIG. 10 is a transverse section view of a leaf stripping module.
Figure 11A:
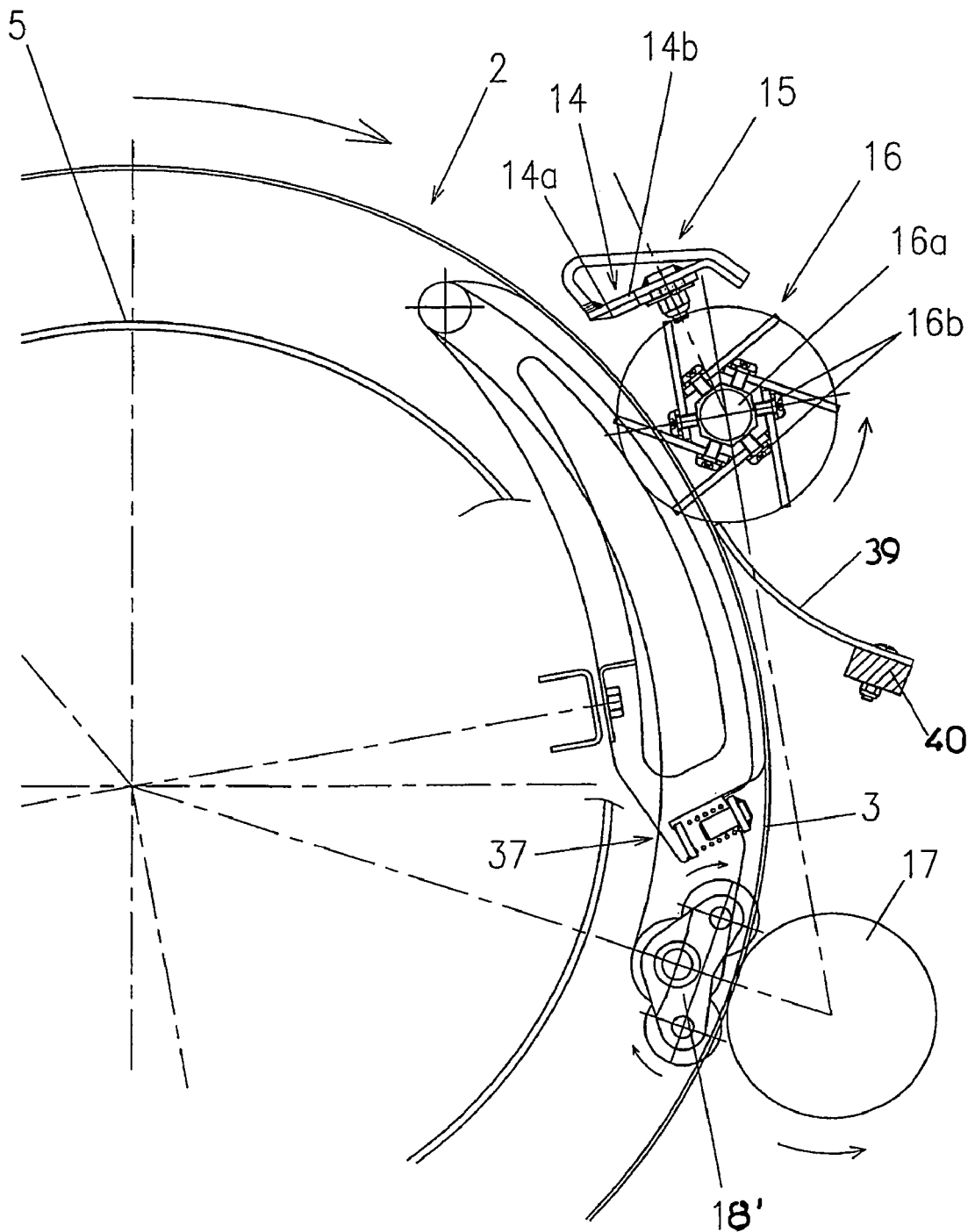
FIG. 11A is a partial detailed sectional view, in a plane, showing the positioning of the entire section and the device for driving the drum in rotation.
Figure 11B:
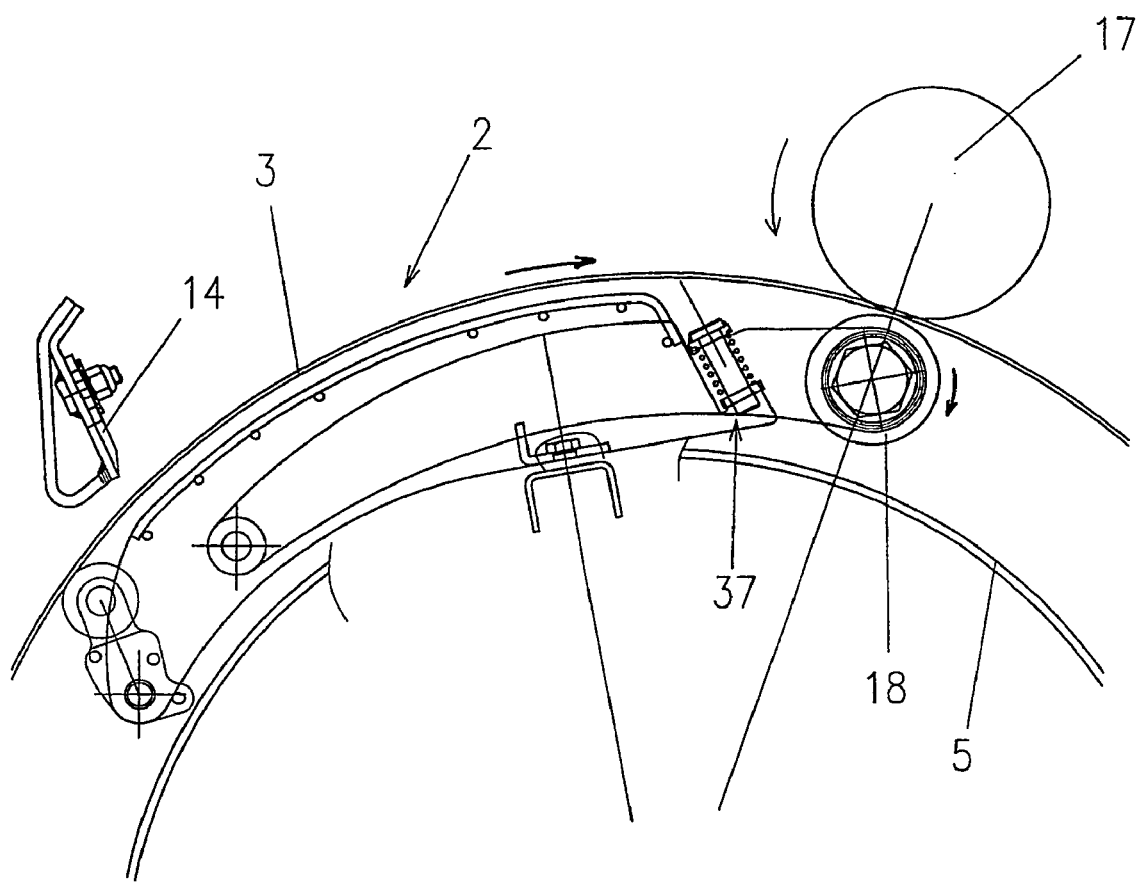
FIG. 11B is another partial detailed sectional view, in a plane, showing another embodiment mode of the device for driving the drum in rotation.
Figure 12:
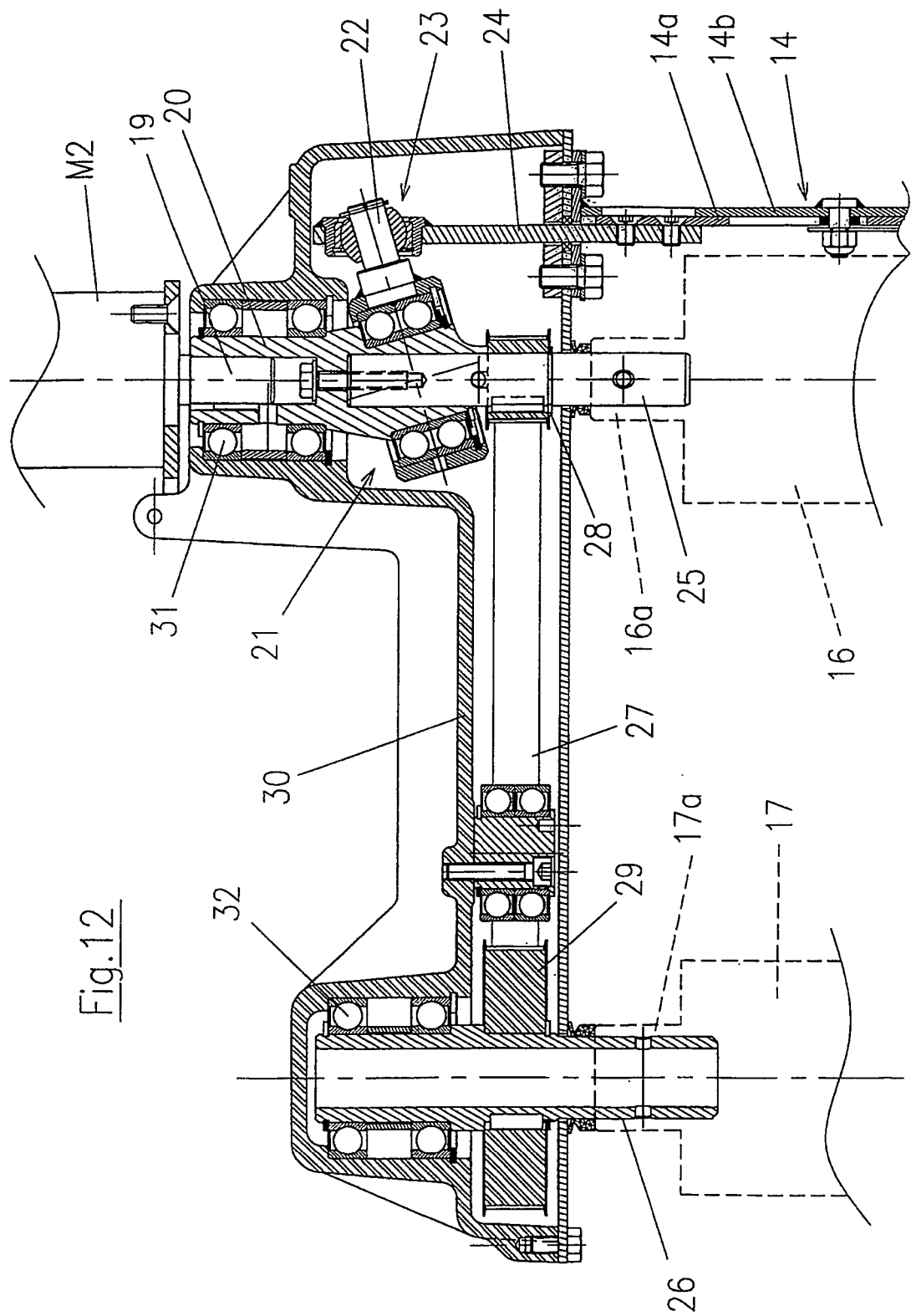
FIG. 12 is a longitudinal section view of the mechanisms for motorization ensuring the driving of the rotating drum, the cutting bar, and the rotating feeder.
Figure 13:
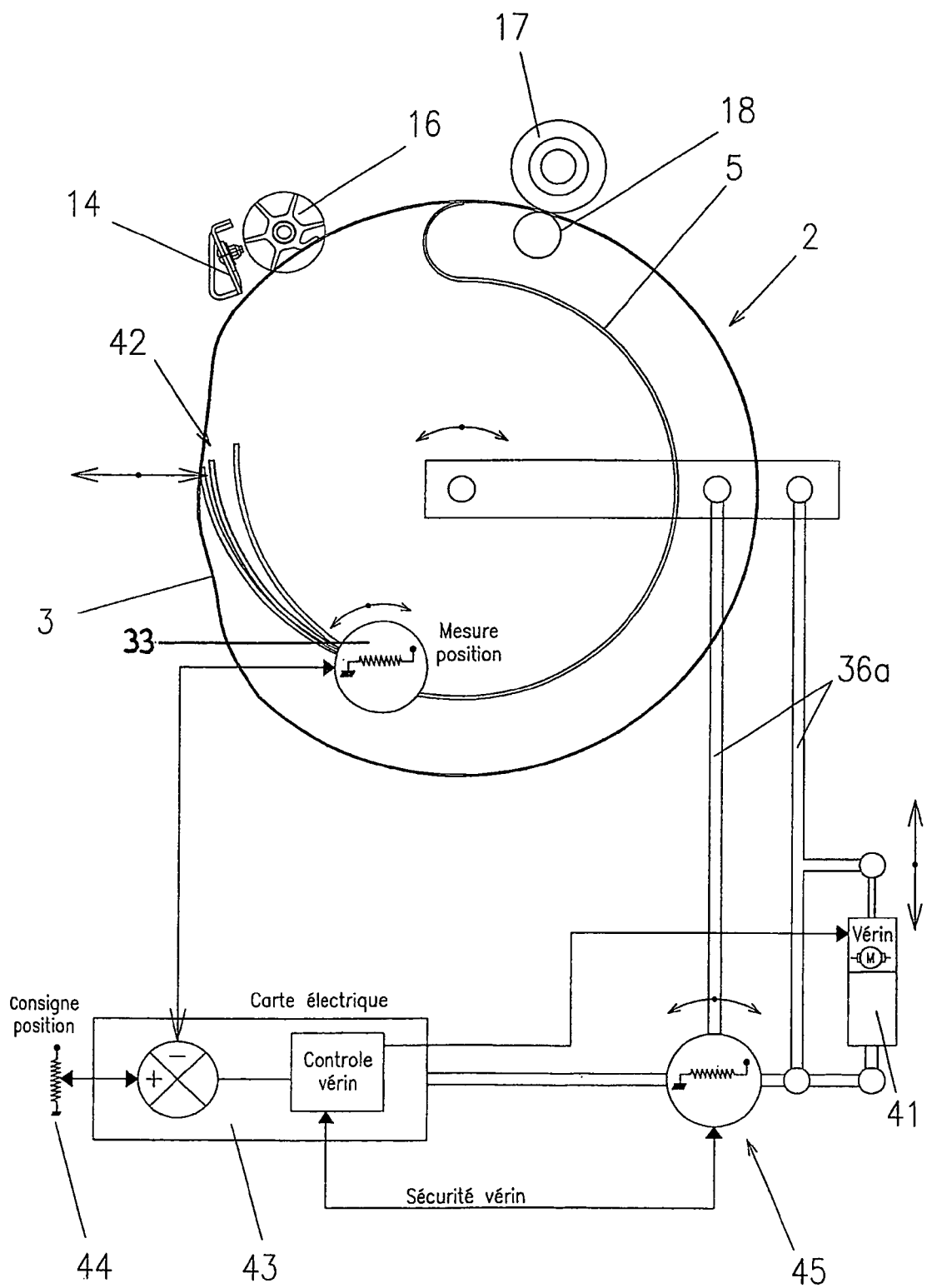
FIG. 13 is a schematic view of the servo-control of a leaf stripping module.

The rotational driving of the drum 2 is done using a vertical roller motor 17 and a counter-contact roller having a vertical axle 18 or a pair of counter-contact rollers 18' with the parallel vertical axles mounted with the ability to pivot around a vertical axle, in the manner of a bogie (FIG. 10). The roller motor 17 is arranged outside the drum 2 while the counter-contact roller 18 or the pair of the counter-contact rollers 18' is placed inside the drum. The flexible opened lateral wall 3 of the drum is pinched between the roller motor 17 and the counter-contact roller 18, or the pair of counter-contact rollers 18' in a manner so that starting the rotation of the roller motor has the effect of driving in rotation the drum 2 suspended by means of the contact rollers 12.

The counter-contact roller 18 or the pair of counter-contact rollers 18' is subjected to the action of elastic pushing mechanisms 37 which hold it permanently under pressure against the internal surface of the flexible lateral wall 3 of the drum which is thus found to be held constantly applied against the drive roller 17.

A flexible vertical flap 39 affixed to a rigid vertical element 40 of the frame of the leaf stripping head can be arranged behind the pulling roller 16, in order to prevent the cut leaves or vine shoots from being able to be taken between the roller motor 17 and the lateral wall 3 of the drum 2.

A common motorization makes possible:
the driving in rotation of the rotating drum 2;
the operation of the cutting bar 14; and
the driving in rotation of the feeder 16.

This common motorization consists of, for example, a hydraulic motor M2 whose output shaft 19 is coupled to the vertical shaft 20 of an eccentric 21 whose connecting rod 22 is coupled, by the intermediary of a ball joint 23 and a link 24 to the upper end of the blade 14a of the cutting bar 14. In this way, the starting of the rotation of the shaft 20 of the eccentric 21 ensures an alternating longitudinal movement of the blade 14a of the cutting bar.

The lower end of the vertical shaft 20 of the eccentric is connected, for example, by the intermediary of a coupling shaft 25, to the upper end of the axle 16a of the rotary feeder 16. It is understood that starting the rotation of the shaft 20 of the eccentric 21 also ensures the rotation of the feeder 16 arranged in the axial extension of the shaft.

The motorization consists of another vertical shaft 26 arranged at a distance from the vertical coupling shaft 25 and connected to this shaft by a transmission, comprised of, for example, a flexible strap wound around the wheels set on these shafts 25, 26, respectively. Preferably, this transmission comprises a belt 27 wound, on the one hand, on a pulley 28 set on the coupling shaft 25, and, on the other hand, on a pulley 29 set on the shaft 26 whose lower end is coupled to the upper end of the vertical axle 17a of the drive roller 17. The receiving pulley 29 has a diameter approximately equal to or slightly greater than that of the driving pulley 28, in a manner so that when the shaft 25 is set into rotation, the shaft 26 is driven in rotation at a speed approximately equal to or slightly slower than that of the shaft 25.

In other words, the tangential speed of the rotating feeder 16 is at least equal to the tangential speed of the drum 2, or slightly greater than that of the drum.

On the other hand, the rotational speed of the drum 2 is equal to or approximately equal to the speed of movement of the leaf stripping machine during work. If you consider that the drum(s) 2 of the leaf stripper roll(s) over the vegetation V, an immobile contact of the drum(s) relative to the vegetation results at a time T. Thus, there is no friction between the leaf stripper, the bunches of grapes and the lateral wall 3 of the drums.

The motorization described above is housed in a case 30 affixed, laterally, to an upper element 6b of the framework of the leaf stripping head. The vertical shafts 20 and 26 are mounted so as to rotate in the bearings 31 and 32, respectively, installed in the case 30.

According to another characteristic arrangement of the invention, the leaf stripping head comprises a servo system that enables, at its leaf stripping head 1 or at each of its leaf stripping heads or modules 1, to follow the profile of the vegetation layer while regulating the contact force of the drum(s) 2 on the vegetation layer, in order to not crush the grape bunches. In the case of a leaf stripper equipped with two symmetrical leaf stripping heads, each leaf stripping head is controlled independently of the other one.

The servo control consists of at least one sensor 33 housed inside the rotating drum 2, near the flexible opened lateral wall 3 of the drum. In an advantageous manner, several stacked sensors are positioned inside the rotating drum 2, preferably at an equal distance from each other, the extreme sensors (upper and lower) of this vertical alignment being arranged at a distance from the upper and lower edges, respectively of the opened lateral wall 3.

The sensors 33 can be advantageously comprised of sensors using the Hall effect installed affixed and coupled to the stacked sensors 42A, 42B, 42C, 42D, . . . placed in contact with the flexible opened lateral wall 3 of the drum 2.

Each sensor 42 is, for example, comprised of a contact shaft with a curved shape supporting a magnet that acts together with the Hall effect sensor 33 to which this sensor is connected, in a manner so that the movements of this sensor 42 are detected and measured by the sensor 33.

As a result, the sensors 33 make it possible to detect and measure the deformations of the flexible lateral wall of the drum, resulting from the encounter of obstacles or an abnormal pressure of the leaf stripping drum on the vegetation. They make it possible to activate the electromechanical instruments or other instruments that control the positioning of the leaf stripping drum relative to the vegetation or vegetation layer V, and, as a result, to correct the position of the drum and ensure a continuous following of the vegetation layer.

The flexibility of the lateral wall 3 makes it possible to press on each sensor 42A, 42B, 42C, 42D, . . . , over a distance on the order of 60 mm.

The leaf stripping head or each leaf stripping head 1 of the leaf stripper is carried by a frame 36, making it possible to mount it behind (FIGS. 1 and 2) or in front of a farm tractor. It is suspended in a pendulum-like manner, for example, by means of an articulation by a horizontal axle 46, connecting a vertical element of its frame 6 to a vertical element of the frame 36 (FIG. 3).

This carrier chassis 36 is (in a manner that is itself known from the prior art) constructed and equipped with mechanisms that make it possible:
to move apart or move together the leaf stripping head or each leaf stripping head 1, relative to the movement axis Y-Y of the leaf stripper, the mechanisms advantageously comprising a deformable suspension parallelogram 36a made by an upper part of the chassis; and
to regulate the position of the leaf stripping drum(s) 2 relative to the vertical; these movements being controlled by the servo system as a function of the information transmitted by the sensors 33.

The servo system consists of another activator 41, for example, comprised of an electric jack provided with an electronic board 43 for management of the servo control using an algorithm that makes it possible to determine successive deformations of the flexible lateral wall of the drum as a function of the instructions sent by the sensors 33. A potentiometer 44 makes it possible to adjust this information in order to regulate the pressure of the leaf stripping module on the vegetation.

The electronic board 43 sends the information to the activator 41 which acts on the deformable parallelogram 36a on which the leaf stripping head 1 is suspended, or each leaf stripping head (1), in a manner so as to obtain an optimum position of the leaf stripping drums 2 relative to the vegetation during work. A potentiometer 45 coupled to the main axis of the parallelogram limits the minimum and maximum distance of the jack.

According to this servo system, an intermediate pushed-back position of the sensors is defined to correspond, for example, to a pushed-in position on the order of 20 mm and at this position, the leaf stripping head maintains a stable position; a more sizeable pushed-in position of the sensors drives a pulling back of the leaf stripping head, while the relaxation of pressure on the sensors drives the movement of the leaf stripping head and its application against the vegetation layer.

Figure 18:
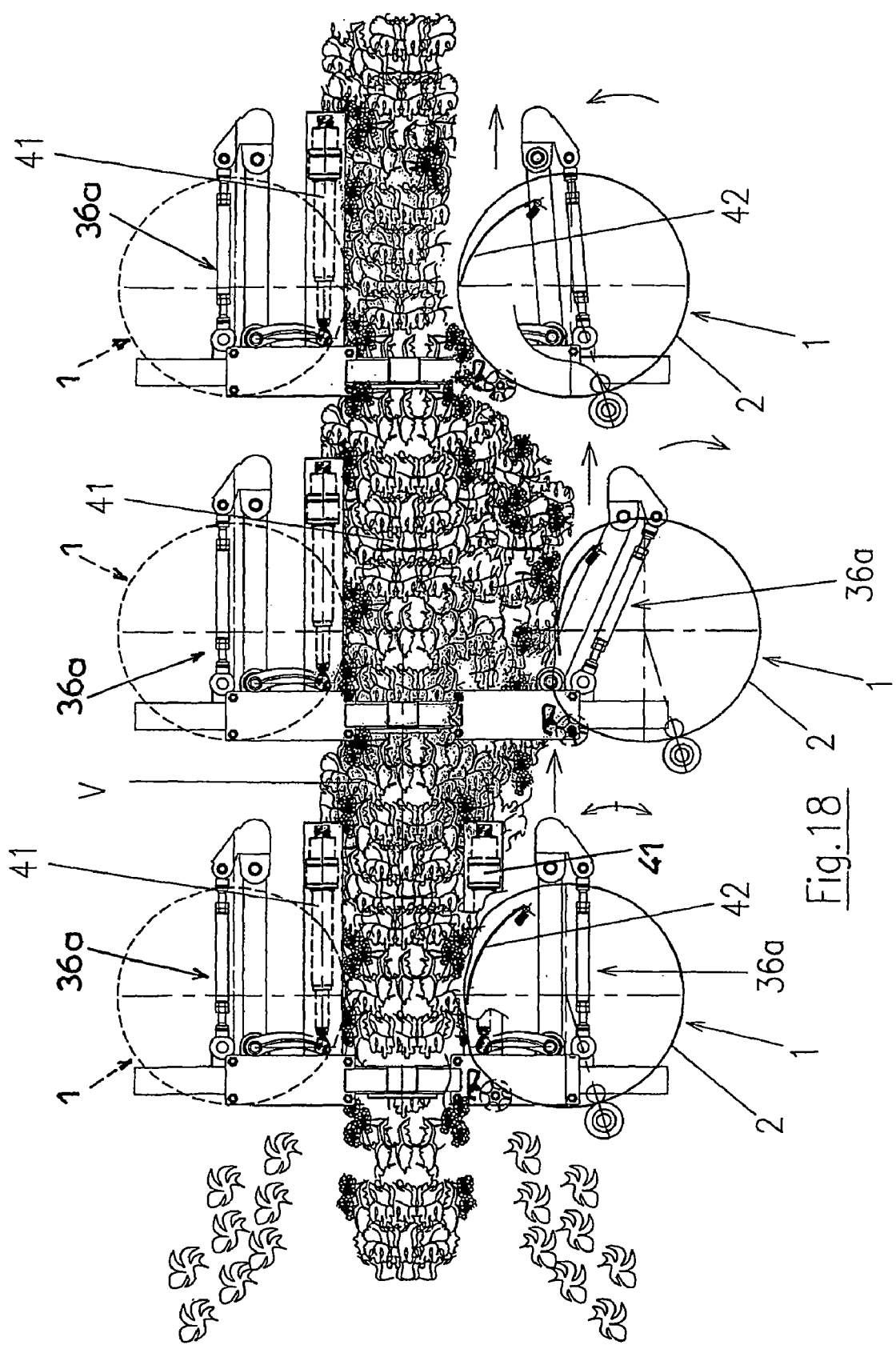
FIG. 18 is a sequential top plan view showing the functioning of the servo system of the leaf stripping modules or heads.

The sequential representation of FIG. 18 shows this functioning. On the left of the drawing, the pressure of the vegetation against the lateral wall of the drum 2 of the leaf stripping head 1 is normal, the sensors are moderately pushed-in, the position of the leaf stripping head is stable. In the center of the drawing, the vegetation layer has a pro-eminent part, the pressure of the vegetation against the lateral wall of the drum is more sizeable, the sensors 42 are very pushed-in, and activate the sensors 33 that send the information to the electronic board 43, the leaf stripping head 1 moves back. On the right of the drawing, the vegetation is not in contact with the drum 2 of the leaf stripping head 1, the sensors are relaxed, the leaf stripping head comes to press against the vegetation. When there is a hole in the vegetation, the sensors 42 are totally decompressed and the leaf stripping head gets closer to the axis of the vine row.

In an advantageous and known manner (WO-01/87047A), a cutting bar 34 or other cutting mechanism such as an alternating cutting bar can be arranged vertically in front of the rotary drum of the leaf stripping head or each leaf stripping head. This cutting bar 34 activated by a hydraulic motor M3 is carried by an element 35 of the leaf stripping machine chassis and is arranged at a sufficient distance from the leaf stripping drum 2, in a manner so that the cutting fragments do not disturb the work of the leaf stripper.

When the leaf stripper comprises two leaf stripping heads, they are arranged on both sides of the vine row and can move in a manner to more or less fit tightly around the row and also to open and re-close at the input and output of the row, respectively. Leaf stripping is thus possible on the two sides of the row, or, alternatively, on one or the other sides. During leaf stripping on only one side, the drum that is located on the other side of the paling can continue to roll over the vegetation, which makes it possible for the paling to be held between two drums and to not be pushed from one side or the other. The absence of leaf stripping action on the side where this action is not desired is obtained by stopping the intake vacuum of the inactive leaf stripping head.

The leaf stripper according to the invention can be easily installed on an inter-row tractor, or on a spanning tractor, or on a multi-function tool holder. It can also be self-propelled.

The invention claimed is:

1. An apparatus for selective leaf stripping of a vine, the apparatus comprising:
    at least one stripping head having a drum, said drum having a cylindrical side wall;
    a means for rotating said drum about a generally vertical axis, said means for rotating cooperative with the stripping head;
    an aspirating means positioned on the stripping head for flowing air through said cylindrical side wall of said drum;
    a channeling means cooperative with said drum for channeling the air flow through a varying portion of said side wall of said drum; and
    a cutting means positioned adjacent to said side wall of said drum, said cutting means for stripping leaves, said cutting means extending in generally parallel relation to said vertical axis about which said drum rotates, said cylindrical side wall being formed of a flexible and deformable material that is permeable so as to allow the air flow to pass therethrough.

2. The apparatus of claim 1, said flexible and deformable material of said cylindrical side wall being of a metallic fabric material.

3. The apparatus of claim 1, further comprising:
    a vehicle having the stripping head thereon, said vehicle having a speed of movement during operation, said drum being rotated by said means for rotating so as to have a tangential rotational speed at least equal to said speed of movement.

4. The apparatus of claim 1, said drum having a circular upper end and a circular lower end, said cylindrical side wall being affixed to said upper and lower ends.

5. The apparatus of claim 4, said circular upper end suspending said cylindrical side wall therefrom.

6. The apparatus of claim 1, further comprising:
    a tensioning means connected to said cylindrical side wall for tensioning said side wall vertically.

7. The apparatus of claim 6, said drum having a lower axle of rotation, said tensioning means comprising:
    a spring extending around said lower axle of rotation so as to act in compression against a lower part of said drum.

8. The apparatus of claim 1, further comprising:
    a leaf pulling means arranged parallel to said vertical axis, said leaf pulling means for pulling on leaves passing thereinto, said leaf pulling means positioned adjacent to said cutting means.

9. The apparatus of claim 8, said leaf pulling means comprising a rotating feeder coupled to a rotating guide.

10. The apparatus of claim 8, said leaf pulling means positioned adjacent to said cylindrical side wall of said drum.

11. The apparatus of claim 9, said rotating feeder comprising:
    an axle having flexible vertical blades affixed thereto and extending therefrom.

12. The apparatus of claim 9, said rotating feeder comprising a brush.

13. The apparatus of claim 9, said drum rotated at a tangential speed, said rotating feeder having a tangential speed at least equal to the tangential speed of said drum.

14. The apparatus of claim 1, further comprising:
a comb arranged in parallel to and in front of said cutting means.

15. The apparatus of claim 1, said cutting means positioned behind a diametrical plane of said drum and oriented perpendicular to a desired movement axis of the stripping head.

16. The apparatus of claim 1, said channeling means comprising a plurality of vertical portions defining an aspirating opening for said means for aspirating, said plurality of vertical portions positioned adjacent an internal surface of said cylindrical side wall of said drum, said plurality of vertical portions being formed of a flexible impermeable material.

17. The apparatus of claim 16, said channeling means comprising an impermeable cloth affixed over said plurality of vertical portions.

18. The apparatus of claim 1, said cutting means comprising a vertical cutting bar oriented at a 45° angle with a radius of said drum extending to a cutting edge of said cutting bar.

19. The apparatus of claim 1, said means for rotating comprising:
a vertical roller motor positioned outside said drum; and
at least one vertical counter-contact roller positioned within said drum, said cylindrical side wall of said drum being pinched between said vertical roller motor and the counter-contact roller.

20. The apparatus of claim 1, said means for rotating comprising:
a vertical roller motor positioned outside said drum; and
a pair of counter-contact rollers having parallel axes, said pair of counter-contact rollers positioned within said drum and pivotable around a vertical axle, said cylindrical side wall of said drum being pinched between said vertical roller motor and said pair of counter-contact roller.

21. The apparatus of claim 19, said means for rotating further comprising:
a common motor drivingly connected to said drum.

22. The apparatus of claim 21, said common motor being a hydraulic motor drivingly connected to a eccentric having a connecting rod coupled to an upper end of said cutting means.

23. The apparatus of claim 19, said at least one counter-contact roller being urged by an elastic pushing mechanism so as to be maintained under pressure against an internal surface of said cylindrical side wall.

24. The apparatus of claim 1, the stripping head being suspended on a carrier chassis which is movable along a movement axis, the apparatus further comprising:
a servo controlling means cooperative with said carrier chassis for moving said stripping head along said movement axis as a function of deformations of said cylindrical side wall.

25. The apparatus of claim 24, said servo controlling means comprising:
a means for detecting the deformations housed within said drum.

26. The apparatus of claim 25, said means for detecting comprising:
at least one sensor housed within said drum adjacent said cylindrical side wall.

27. The apparatus of claim 26, said at least one sensor comprising:
a plurality of sensors positioned in vertical alignment and spaced from each other within said drum.

28. The apparatus of claim 26, said at least one sensor comprising a contact shaft in contact with said cylindrical side wall.

29. The apparatus of claim 24, said servo controlling means comprising:
an electrical jack having an electronic board suitable for servo control by using an algorithm to determine successive deformations of said cylindrical side wall of said drum, said servo controlling means for acting on a deformable parallelogram on which the stripping head is suspended so as to set an optimum position of said drum.

* * * * *